United States Patent
Miersch-Wiemers et al.

(10) Patent No.: US 8,332,123 B2
(45) Date of Patent: Dec. 11, 2012

(54) METHOD AND APPARATUS FOR DETECTING A CONTINUOUS INGRESS OF FUEL INTO THE LUBRICATING OIL OF AN INTERNAL COMBUSTION ENGINE DURING COLD STARTING

(75) Inventors: Oliver Miersch-Wiemers, Stuttgart (DE); Norbert Mueller, Farmington Hills, MI (US); Mike Dürr, Benningen (DE); Juergen Raimann, Weil Der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 862 days.

(21) Appl. No.: 12/517,330

(22) PCT Filed: Nov. 23, 2007

(86) PCT No.: PCT/EP2007/062724
§ 371 (c)(1),
(2), (4) Date: Jun. 2, 2009

(87) PCT Pub. No.: WO2008/074591
PCT Pub. Date: Jun. 26, 2008

(65) Prior Publication Data
US 2010/0070152 A1 Mar. 18, 2010

(30) Foreign Application Priority Data
Dec. 18, 2006 (DE) .......................... 10 2006 059 675

(51) Int. Cl.
*F02D 43/00* (2006.01)
*F01M 11/10* (2006.01)
*G01M 15/04* (2006.01)

(52) U.S. Cl. .................................................... 701/102
(58) Field of Classification Search .................. 701/102, 701/101, 103, 114, 115; 73/114.55, 53.05
See application file for complete search history.

(56) References Cited

U.S. PATENT DOCUMENTS

| | | | |
|---|---|---|---|
| 7,096,113 B2 * | 8/2006 | Ludwig et al. | 701/115 |
| 7,260,982 B2 * | 8/2007 | Utz et al. | 73/114.55 |
| 2006/0016429 A1 | 1/2006 | Mashiki | |
| 2006/0219207 A1 | 10/2006 | Toda | |

FOREIGN PATENT DOCUMENTS

| | | |
|---|---|---|
| DE | 10 2004 033 413 | 2/2006 |
| DE | 10 2004 033 414 | 2/2006 |
| DE | 102009046417 A1 * | 5/2011 |
| EP | 1 357 280 | 10/2003 |
| EP | 1 602 815 | 12/2005 |
| EP | 1 722 087 | 11/2006 |
| FR | 2 862 087 | 5/2005 |
| FR | 2 866 957 | 9/2005 |
| FR | 2 872 214 | 12/2005 |
| JP | 2004285977 A * | 10/2004 |

* cited by examiner

*Primary Examiner* — Hieu T Vo
(74) *Attorney, Agent, or Firm* — Merchant & Gould P.C.

(57) ABSTRACT

In a method and an apparatus for detecting a continuous ingress of fuel into the lubricating oil of an internal combustion engine, that is to say oil dilution, in particular of a motor vehicle during cold starting, there is provision, in particular, for the continuous ingress of fuel to be detected by means of a lambda control. The continuous ingress of fuel is preferably determined using the outgassing of fuel from a crankcase of the internal combustion engine, wherein the depletion is based on adaptation values of the lambda control.

10 Claims, 4 Drawing Sheets

METHOD AND APPARATUS FOR DETECTING A CONTINUOUS INGRESS OF FUEL INTO THE LUBRICATING OIL OF AN INTERNAL COMBUSTION ENGINE DURING COLD STARTING

TECHNICAL FIELD

The invention at hand relates to a method for detecting a continuous ingress of fuel into the lubricating oil of an internal combustion engine, in particular of a motor vehicle during cold starting as well as a control unit for controlling an internal combustion engine in accordance with such a method, according to the preambles of the respective dependent claims.

BACKGROUND

In present-day internal combustion engines with direct gasoline injection, the fuel supply takes place in an inherently known manner with fuel pressures up to 200 bar. In individual regions of the direct gasoline injection, as, for example, during spray-form combustion processes or in highly supercharged internal combustion engines, still higher pressures even occur. In order to transmit the forces required for producing these pressures from a camshaft or a crankshaft of the internal combustion engine to a high pressure pump, the pump tappets generally known to be used in these pumps have to be supplied with lubricating oil from the oil circuit of the internal combustion engine.

If an increased leakage now occurs between the gaskets disposed in the oil circuit and those disposed in the fuel circuit, fuel with the prefeed pressure of a low pressure circuit disposed in the internal combustion engine can thus enter into said oil circuit. The consequent dilution of the lubricating oil (engine oil) of the internal combustion engine is predetermined in the pre-published German patent applications DE 10 2004 033 413 A1 and DE 10 2004 033 414 A1.

In the aforementioned German patent DE 10 2004 033 413 A1, an oil dilution signal is notably ascertained, which is a measurement for the volume of the oil dilution, which has ingressed into the engine oil of the internal combustion engine as a result of at least one fuel afterinjection. The stated afterinjection serves the purpose of introducing uncombusted fuel as the combustible into the exhaust gas zone of the internal combustion engine. Said uncombusted fuel reacts exothermally to heat an exhaust gas treatment apparatus. It is thereby possible to ascertain the oil dilution solely from existing operating parameters of the internal combustion engine.

In the aforementioned German patent DE 10 2004 033 414 A1, it is additionally proposed to take said oil dilution signal into account when the oil level of the engine oil of the internal combustion engine is ascertained. It is thereby possible to be able to ascertain the measurement for the oil level solely from existing operating parameters of the internal combustion engine.

Said oil dilution leads to a shortened service life of the internal combustion engine on account of the degraded lubrication.

Oil quality sensors are already used for monitoring the quality of the oil. An increased fuel ingress, which was previously described, leads by means of these sensors to drastically shortened oil change intervals, which, of course, prevent damage to the internal combustion engine. However, on account of the shortened service intervals and the increased expenses, which go along with them, acceptance of the stated internal combustion engines with direct fuel injection by the driving public is rather impeded.

Moreover, due to the additional installation costs for these oil quality sensors, said sensors are only used in internal combustion engines of the upscale vehicle class and are for this reason not yet widely used.

Furthermore, the detection of a leaky high pressure pump is also not unambiguously possible on the basis of said oil quality sensors.

SUMMARY

The idea underlying the invention at hand is to detect a continuous ingress of fuel into the lubricating oil of an internal combustion engine during cold starting of said engine by means of a lambda control.

The technical effect at the basis of the invention lies in the fact that the ingress of fuel vapors from the crankcase ventilation into an intake manifold of the internal combustion engine leads to a mixture enrichment in the combustion chamber, respectively in the combustion chambers, of the internal combustion engine and in so doing to a change in the measured values at a lambda probe of the lambda control. Because the lambda control is activated anyway in an operating state of the internal combustion engine, the outgassing of fuel from the crankcase can be reliably detected as a leaning of the adaptation values of an idling control working in conjunction with the lambda control.

The size of the measured value, which is measured at the lambda probe, is dependant on the height of the mass flow rate of the fuel vapors and the operating point, which is currently set in the internal combustion engine, i.e. the relative air mass of the fuel/air mixture. This mass flow rate is additionally dependant on the concentration of fuel in the oil and on the operating temperature of the internal combustion engine.

Said adaptation values are subject to additional interference factors, as, for example, interferences due to plate-out on the fuel intake valves, to leaks in the intake manifold, to plate-out in the fuel injectors or to leaks in or influences by the fuel tank ventilation. For this reason, a temporal change in the adaptation values of the lambda control as a function of a reproducible change in the condition of the internal combustion engine is preferably used according to the invention for detecting a leak in the high pressure pump.

The invention is, furthermore, based on the knowledge that such a reproducible, temporal change during cold starting of the internal combustion engine is given at temperatures between 10 and 30° C.

The invention makes a reliable detection of a aforementioned leak in a high pressure pump, which was described at the beginning of the application, possible.

The method according to the invention can be implemented in a control unit of the internal combustion engine in the form of a control code or in the form of an electronic circuit.

BRIEF DESCRIPTION OF THE DRAWINGS

The invention is subsequently described in detail, while using the accompanying drawings, on the basis of possible embodiments, from which additional characteristics and advantages of the invention arise.

The following items are shown in the drawings.

DETAILED DESCRIPTION

Figure 1A:
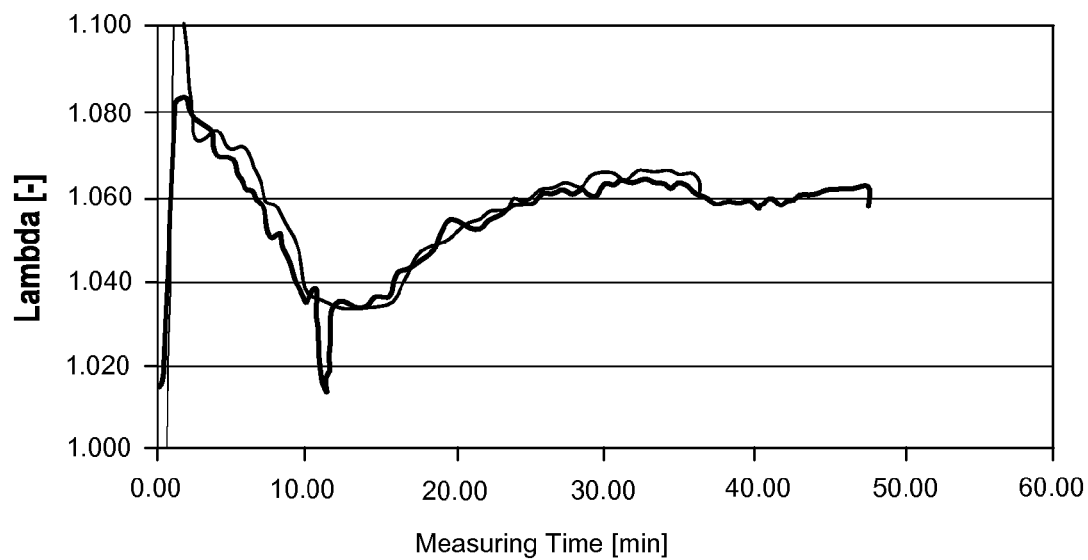
FIGS. 1a-1c illustrate three temporal progressions of a lambda signal to illustrate the method according to the invention when operating an internal combustion engine, which is of concern here, during cold starting

The temporal progression of the raw signal delivered by a lambda probe is shown in FIG. 1a. Said signal was ascertained from a test bench engine during a cold start with subsequent idling. Two raw signals measured on the test bench engine at different times are depicted in FIG. 1a. The current raw signal corresponds to the situation of an operative seal between the oil circuit and the fuel circuit, i.e. currently no oil dilution effect, which was described at the beginning of the application, has occurred.

The raw signal progression of lambda, which is shown, was measured between cold starting the engine at t=0.00 min and a prevailing upper time limit of about 37.00 at the first of the stated curves, respectively 50.00 min. at the second of these curves. In fact, said progression was measured during engine idle and at an operating temperature of the test bench engine, respectively oil temperature, of 80° C., which finally occurs after approximately 30.00 min.

As is apparent in FIG. 1a, the raw signal passes through a characteristic curve, wherein the signal after a short settling phase of approximately 3 min. continually decreases within approximately 10 min. From this point in time forward, the gasoline, which ingressed into the oil as a result of the cold start-up, begins to evaporate due to the increased temperature of the engine oil. This evaporating gasoline now leads to an enrichment of the fuel/air mixture and the signal of the lambda probe decreases accordingly.

Figure 1B:
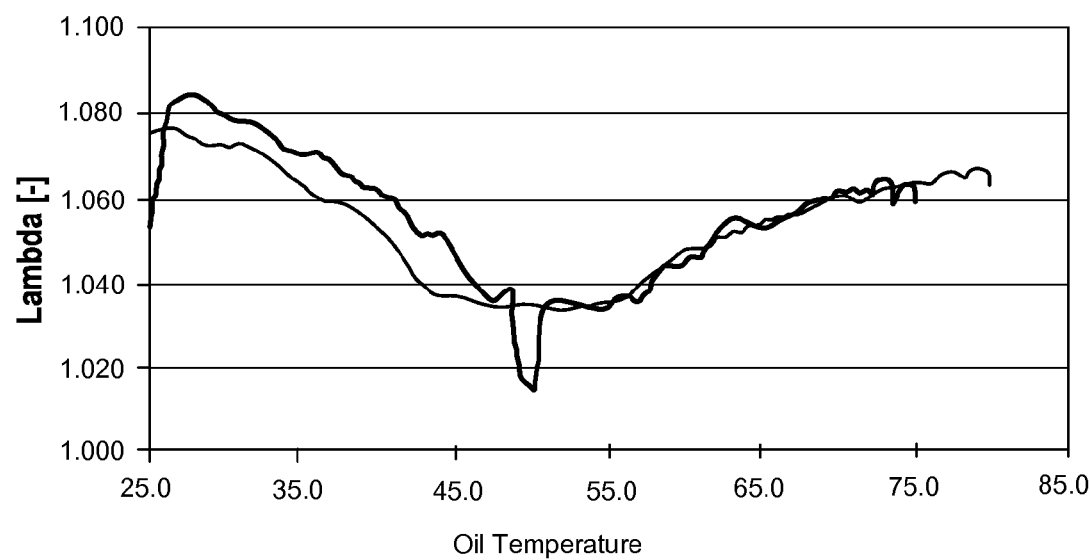

After the engine oil has completely warmed up at approximately 30 min., the raw signal assumes an almost constant value, which approximates very closely the value, which prevailed shortly after the start-up. FIG. 1b illustrates the corresponding progression of lambda as a function of the oil temperature in the previously stated time frame of up to 30 min.

In situations as, for example, the winter operation of a motor vehicle, wherein the engine is started at very low temperatures, or in cases, wherein a plurality of restarts occur, the amount of fuel, which has ingressed into the engine oil, during start-up can be very large. The enrichment after 10 min. of engine operation can even in these instances assume substantial values. In such instances after an hour of engine operation at idle, the gasoline has admittedly also evaporated as far as possible.

If now during the engine operation, a continuous ingress of fuel is added to the gasoline ingress, which was already described during cold starting, the evaporation behavior then changes to the effect that after the rapid evaporation of the fuel up until 10 min. of operating time of the engine, no or at least no complete approximation of the initial value takes place after 60 min. of engine operation.

Instead of that, the lambda signal remains in this case at a significantly reduced, i.e. richer, lambda value. Because this lambda value can be changed by the other influencing variables previously described, the absolute value is not crucial, but a comparison between the lambda value after 60 min. of operation with the lambda value ascertained within 3-5 min. after starting the engine has to occur. Because the remaining influencing variables are already present when the engine is cold, the influence of these interferences is eliminated by taking the difference between the lambda values as previously stated.

Figure 1C:
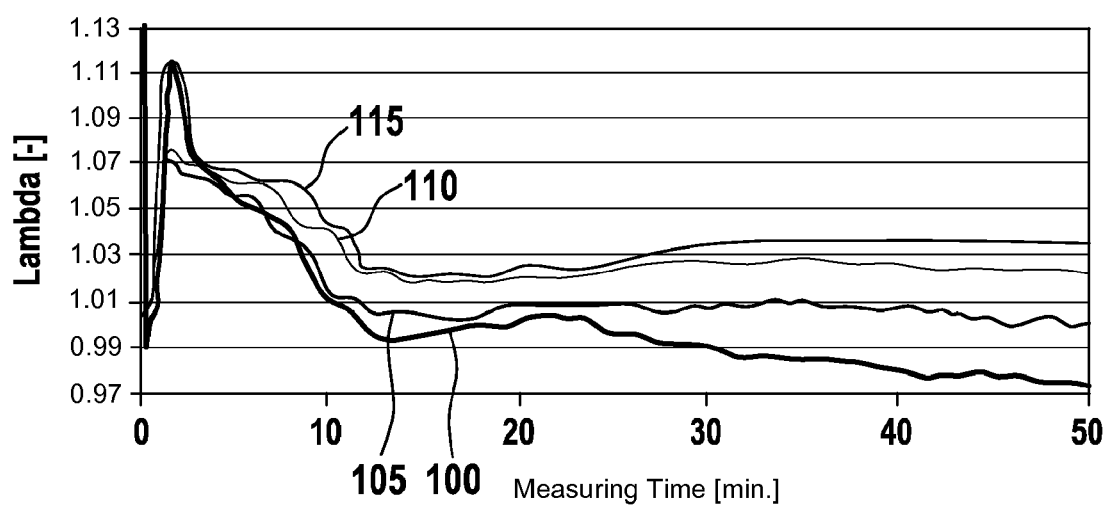

FIG. 1c shows (measured) progressions of lambda, which typically result in situations with an inoperative seal between the oil circuit and the fuel circuit, i.e. an oil dilution, which was described at the beginning of the application, currently occurs due to a continuous ingress of fuel. Again the lambda value during cold starting was measured at idle up to an engine operating temperature of 80° C. The different curves thereby represent progressions with in each case a different height in the ingress of fuel, the height of the ingress of fuel systematically decreasing between the lower curve 100 up until the upper curve 115.

The lambda curves 100-115 respectively correspond to ingresses of fuel in the stated order of 160 ml/h, 80 ml/hr, 40 ml and 20 ml/hr. In so doing, these amounts of leakage by the high pressure pump mentioned at the beginning of the application, respectively the consequent ingresses of fuel into the lubricating oil of the internal combustion engine, can be unambiguously distinguished from each other already during idling of the internal combustion engine.

Figure 2A:
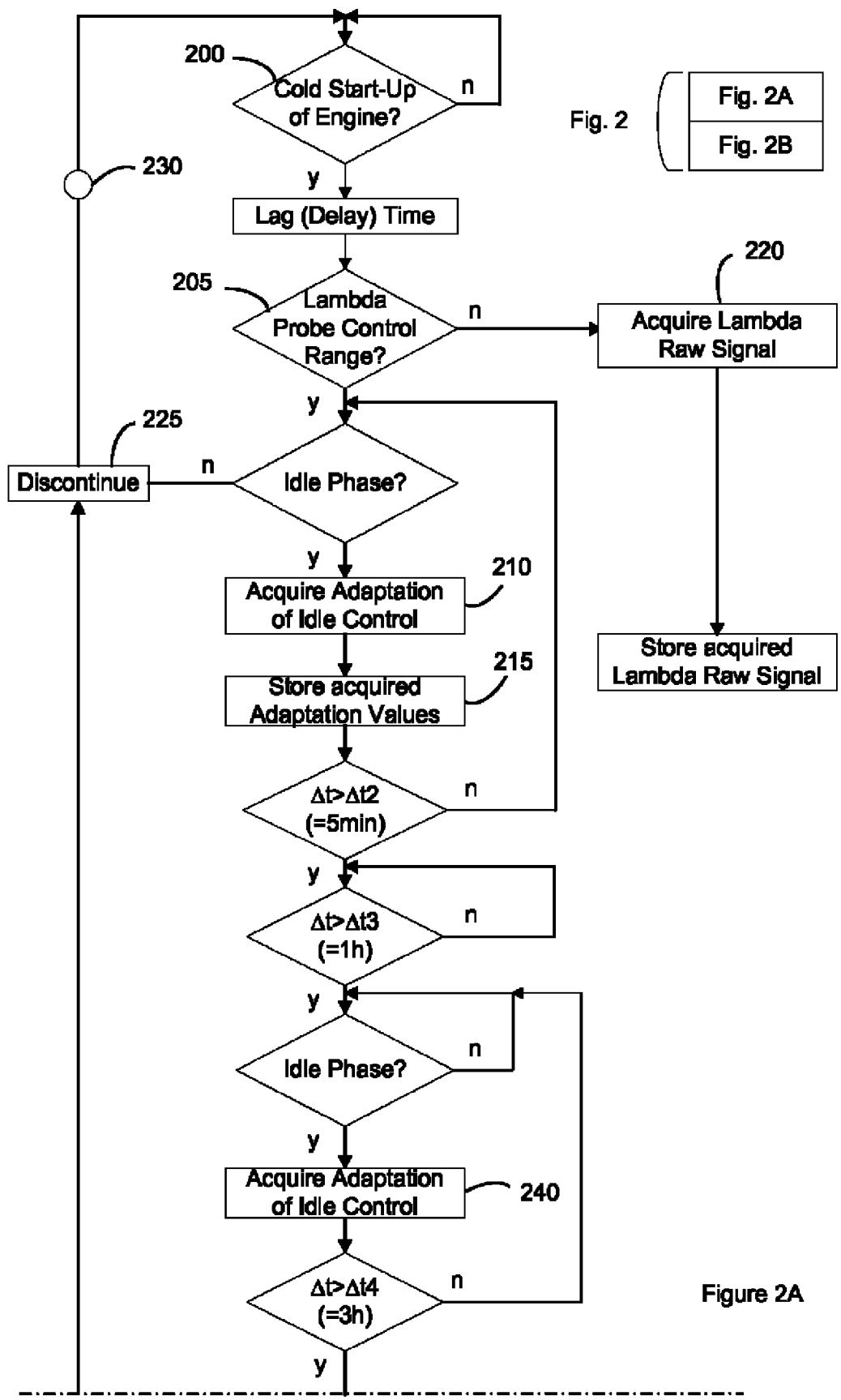
FIG. 2 is a preferred embodiment of the method according to the invention on the basis of a flow diagram.
Figure 2B:
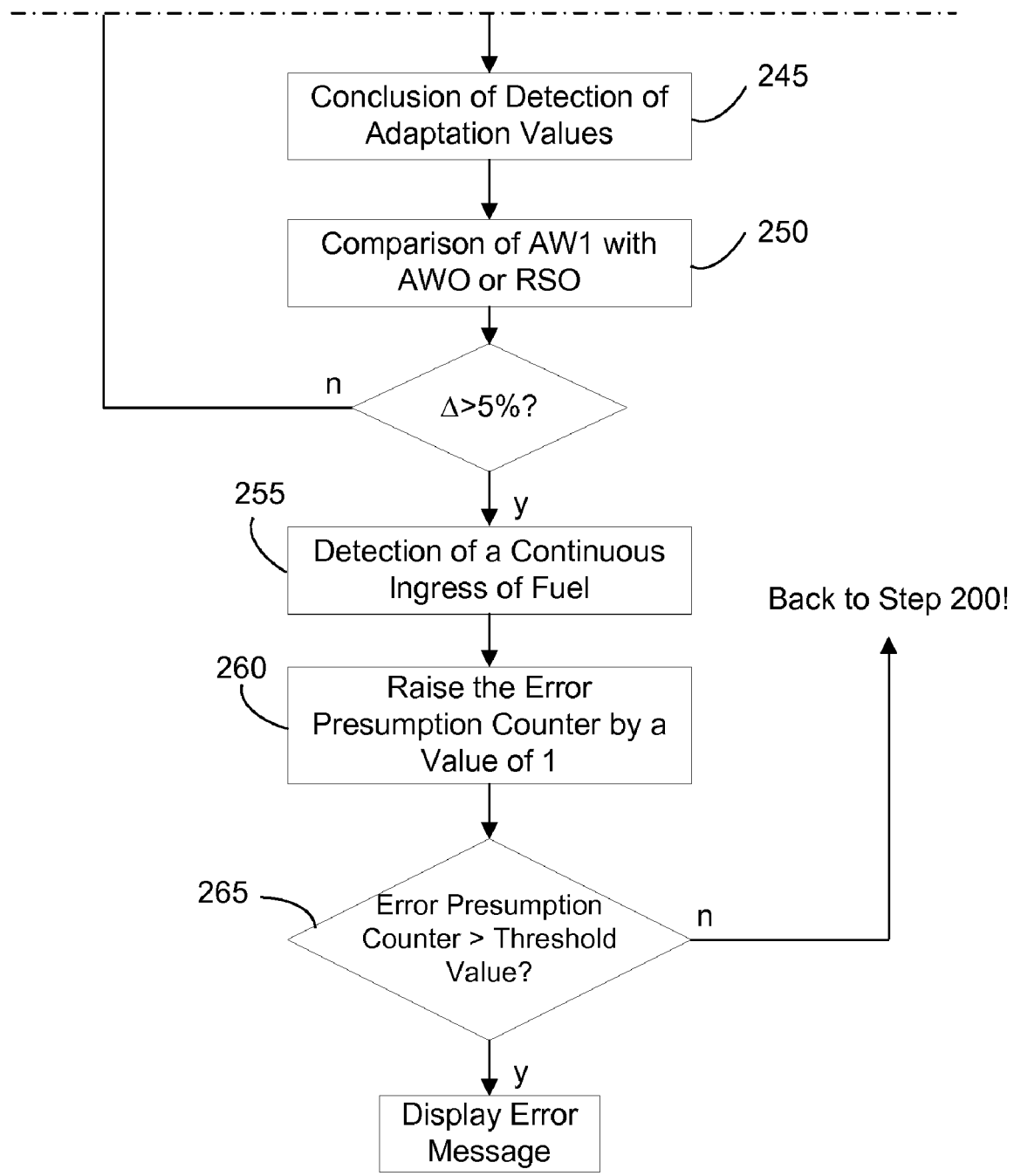

Using FIG. 2, a preferred embodiment of the method according to the invention is now described to quantitatively ascertain as previously stated an ingress of gasoline into the engine oil of an internal combustion engine with the aid of a flow diagram.

After a start-up 200 of the engine has been detected, a test 205 is initially made after a time t1 of preferably 3 min. has elapsed since the start-up, to determine whether the lambda probe is already ready for operation. If this is the case, an adaptation of the idling control, which is caused by the lambda probe in an inherently known manner, is detected 210 and stored 215 in the preferred time frame Δt2 of 3 to 5 min. after starting the engine. If, however, still no readiness for closed-loop control by the lambda probe exists in the time frame Δt2, the raw signal of the lambda probe is detected 220 and is used in the successive ascertaining steps. If no idling phase in the operation of the engine occurs in the time frame Δt2, it is therefore impossible to ascertain the ingress of gasoline and the process is terminated 225 during the current cold start-up, in particular for the preservation of resources. The ascertainment of the ingress of gasoline is then again attempted 230 during the next cold start-up.

If an initial value of the lambda adaptation or a lambda raw value could be detected, a detection 235 is then performed after operating the engine for at least 1 hr to determine whether an idling phase is present. If this mode of operation is present, an actual value of the lambda adaptation is detected 240 in the steady-state mode of operation, which is present from now on.

It should be emphasized that the point in time of the detection of the lambda adaptation should not take place too late in the driving operation of the engine, respectively the motor vehicle. This is the case because deviations in said disturbance variables are then more likely with a longer operating time of the engine. The detection of said lambda values is therefore terminated 245 in the embodiment at hand after 3 hr., if an idling phase has not taken place up until then.

The currently detected value for lambda is compared 250 with the initial value according to the invention. If said value for lambda deviates by more than 5% from the initial value, the presence of a continuous ingress of fuel is diagnosed 255. If this deviation is diagnosed, an error presumption counter, for which provision is preferably made in an engine control unit, is raised 260 by a value of '1' in the embodiment at hand. If the current reading of said error presumption counter achieves, respectively exceeds, an empirically specifiable threshold value 265 after a number of cold start-ups, an error reaction occurs, for example an error message transmitted via the dashboard instruments of the motor vehicle or an indication of needed service is relayed to the driver. Said error presumption counter can alternatively be read out during a regular service inspection.

The invention claimed is:

1. A control unit for operating an internal combustion engine, wherein the control unit is further configured to implement a method of detecting a continuous ingress of a fuel into a lubricating oil of the internal combustion engine of a motor vehicle during a cold starting, the method comprising detecting the continuous ingress of fuel with a lambda control.

2. A method of detecting a continuous ingress of a fuel into a lubricating oil of an internal combustion engine of a motor vehicle during a cold starting, the method comprising detecting the continuous ingress of fuel with a lambda control.

3. The method according to claim 2, further comprising ascertaining the continuous ingress of fuel on a basis of an outgassing of fuel from a crankcase of the internal combustion engine, wherein a leaning of one or more adaptation values of an idling control being taken as a basis.

4. The method according to claim 3, further comprising using a temporal change in the one or more adaptation values of the idling control as a function of a reproducible change in the condition of the internal combustion engine.

5. The method according to claim 4, further comprising assuming a presence of the reproducible change during cold starting of the internal combustion engine wherein a temperature range of the lubricating oil is between 10 and 30 degrees C.

6. The method of claim according to claim 3, further comprising detecting the one or more adaptation values of the idling control in a steady-state operating mode of the internal combustion engine.

7. The method according to claim 2, further comprising detecting the continuous ingress of fuel in an idling operation phase of the internal combustion engine.

8. The method according to claim 2, further comprising implementing the detection of the continuous ingress of fuel in a time period preferably up until three hours after cold starting the internal combustion engine.

9. The method according to claim 2, further comprising comparing a currently detected lambda value with an initial value, wherein the presence of a continuous ingress of fuel is detected upon a deviation in the currently detected lambda of preferably more than 5% from the initial value.

10. The method according to claim 9, further comprising incrementing an error presumption counter preferably disposed in a control unit of the internal combustion engine by a value of '1' upon detection of the presence of a continuous ingress of fuel, and wherein an error reaction occurs when the value of the error presumption counter achieves or exceeds a predetermined threshold value.

* * * * *